United States Patent [19]

Yamada

[11] Patent Number: 5,640,401

[45] Date of Patent: *Jun. 17, 1997

[54] COMMUNICATION CIRCUIT FAULT DETECTOR

[75] Inventor: Yoshiko Yamada, Amagasaki, Japan

[73] Assignee: Mitsubishi Denki Kabushiki Kaisha, Tokyo, Japan

[*] Notice: The term of this patent shall not extend beyond the expiration date of Pat. No. 5,485,470.

[21] Appl. No.: 426,909

[22] Filed: Apr. 21, 1995

Related U.S. Application Data

[62] Division of Ser. No. 42,761, Apr. 6, 1993, which is a continuation of Ser. No. 531,130, May 31, 1990.

[30] Foreign Application Priority Data

Jun. 1, 1989 [JP] Japan ................ 1-141544

[51] Int. Cl.⁶ ...................................... G06F 11/00
[52] U.S. Cl. .................. 371/20.5; 371/34; 370/249
[58] Field of Search ..................... 371/20.5, 34, 67.1, 371/69.1, 20.4; 370/15, 69.1

[56] References Cited

U.S. PATENT DOCUMENTS

| Re. 27,864 | 1/1974 | Davis et al. | 370/15 |
|---|---|---|---|
| 3,402,389 | 9/1968 | Kountz | 371/34 |
| 3,453,592 | 7/1969 | Ishii et al. | 371/27 |
| 3,787,628 | 1/1974 | Van Dijk et al. | 370/15 |
| 3,986,168 | 10/1976 | Anderson | 371/20.4 |
| 4,156,110 | 5/1979 | Keeney et al. | 379/15 BF |
| 4,428,076 | 1/1984 | Schuon | 371/5.1 |
| 4,601,028 | 7/1986 | Huffman et al. | 370/15 |
| 4,631,719 | 12/1986 | Huffman et al. | 370/15 |
| 4,712,209 | 12/1987 | Kuritani | 370/13 |
| 4,750,181 | 6/1988 | McDonald et al. | 371/71 |
| 4,858,224 | 8/1989 | Nakano et al. | 370/16 |
| 4,860,281 | 8/1989 | Finley et al. | 370/15 |
| 4,926,423 | 5/1990 | Zukowski | 370/112 |
| 5,056,087 | 10/1991 | Ferguson | 370/84 |
| 5,265,089 | 11/1993 | Yonehara | 370/15 |
| 5,485,470 | 1/1996 | Yamada | 371/20.5 |

FOREIGN PATENT DOCUMENTS

| 0264879 | 4/1988 | European Pat. Off. . |
|---|---|---|
| 2329770 | 9/1977 | Germany . |
| 62-281546 | 12/1987 | Japan . |
| 63-56029 | 3/1988 | Japan . |
| 2028063 | 2/1980 | United Kingdom . |

OTHER PUBLICATIONS

Bodart et al., Code and Speed Dependent TDM System 3TR 1600 for Telegraph & Data Transmission, Philips Telecommunication Review, vol. 36, No. 4, (Nov. 1978).

Fletcher, An Engineering Approach to Digital Design, Prentice Hall, ©1980.

*Primary Examiner*—Robert W. Beausoliel, Jr.
*Assistant Examiner*—Ly V. Hua

[57] ABSTRACT

A communication circuit fault detector tests a communication circuit by using a sequence generator to generate a test signal, a memory circuit to temporarily store the test signal, and a multiplexer to multiplex the test signal and an input data signal into the communication circuit. A timing generator drives the communication circuit at a rate higher than the normal communication rate, enabling the data signal and test signal to be sent through the communication circuit simultaneously. A demultiplexer demultiplexes the output signal from the communication circuit into an output data signal and a returned test signal. A comparator compares the returned test signal with the test signal stored in the memory circuit and generates a result signal indicating whether they match.

9 Claims, 6 Drawing Sheets

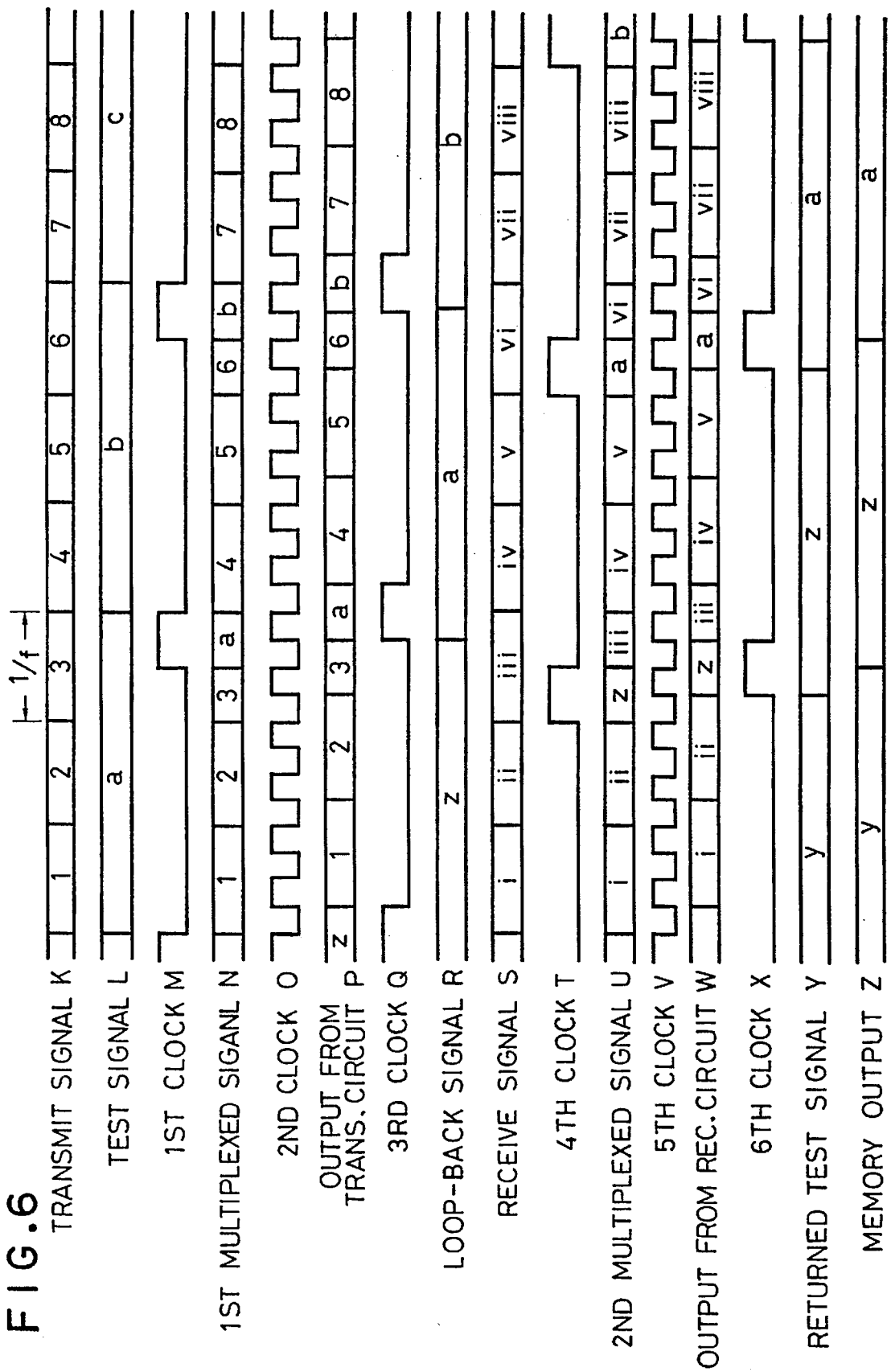

COMMUNICATION CIRCUIT FAULT DETECTOR

This application is a divisional of copending application Ser. No. 08/042,761, filed on Apr. 6, 1993 which was a continuation application under 37 CFR 1.62 of pending prior application Ser. No. 07/531,130 filed on May 31, 1990, the entire contents of which are hereby incorporated by reference.

BACKGROUND OF THE INVENTION

This invention relates to a communication circuit fault detector for testing a communication circuit.

The term communication circuit refers generally to a circuit that receives an input data signal at one location and reproduces a substantially identical output data signal at another location. Communication circuits are ubiquitous in data processing systems, being used for communication between separate data processing equipment, between separate printed circuit boards in the same data processing equipment, and between separate components on the same printed circuit board.

The usual method of testing a communication circuit is to perform a loop test by sending known test signals through the communication circuit, looping the test signals back to their point of origin, and comparing the returned test signals with the original test signals. Prior-art apparatus for this purpose comprises devices for generating and comparing the test signals, and a switch that connects the output side of the communication circuit to either its normal output line or a loop-back line. During data communication, the switch is set to the normal output line position. To test the communication circuit, normal data communication is halted and the switch is moved to the loop-back position; then a test signal sequence is sent through the communication circuit, returned via the loop-back line, and compared.

A problem with this system is that it is not possible to test the communication circuit during normal operation; hence tests are inconvenient to perform and faults cannot be detected promptly.

SUMMARY OF THE INVENTION

An object of the present invention is accordingly to test a communication circuit during normal data communication.

A communication circuit fault detector has a sequence generator for generating a test signal, and a memory circuit for temporarily storing the test signal. A multiplexer multiplexes the test signal and an input data signal into the communication circuit. A timing generator drives the communication circuit at a rate higher than the normal communication rate. A demultiplexer demultiplexes the output signal from the communication circuit into an output data signal and a returned test signal. A comparator compares the returned test signal with the test signal stored in the memory circuit, and generates a result signal indicating whether the two signals match.

BRIEF DESCRIPTION OF THE DRAWINGS

FIG. 6 is a timing diagram illustrating the operation of the communication circuit fault detector in FIG. 4 for the case n=3.

DETAILED DESCRIPTION OF THE INVENTION

The invention will be described by showing two embodiments of the communication circuit fault detector of the present invention. The first, illustrated in FIGS. 2 and 3, tests a uni-directional communication circuit. The second, illustrated in FIGS. 4, 5, and 6, tests a bi-directional communication circuit.

Figure 1:
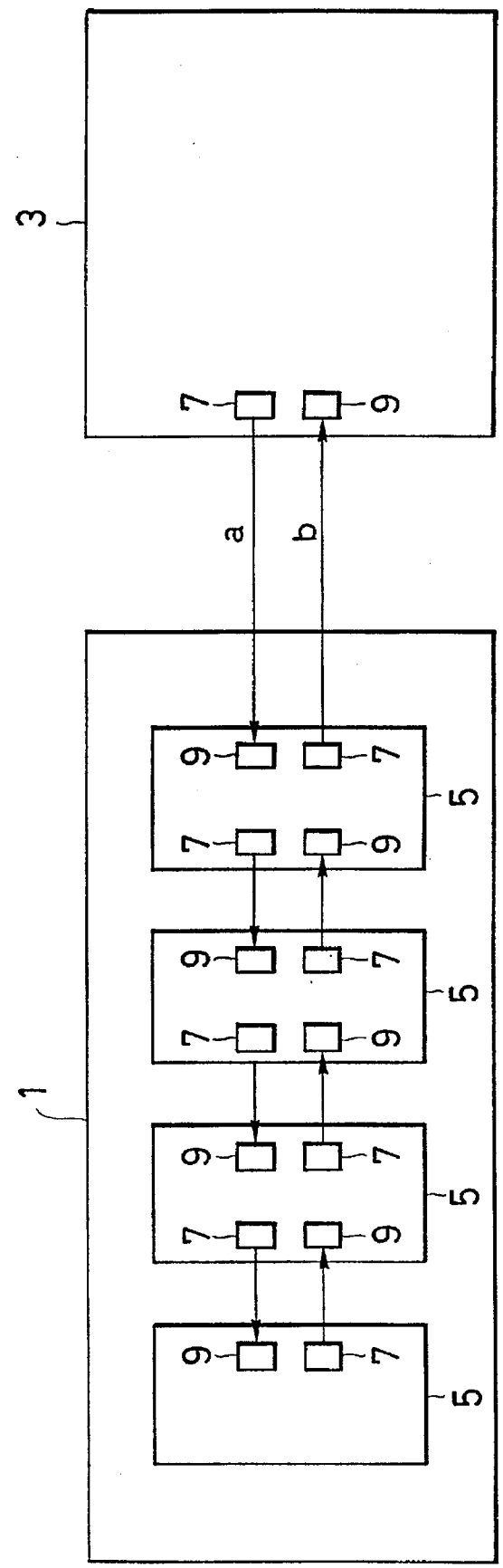
FIG. 1 is a block diagram illustrating data processing apparatus to which the invention is applicable.

FIG. 1 is a block diagram illustrating the general type of apparatus to which the invention is applicable. A first data processing apparatus 1 communicates with a second data processing apparatus 3 via a pair of signal lines indicated by arrows (a and b). The first data processing apparatus 1 comprises a plurality of printed circuit boards 5 which communicate with each other by further signal lines, also indicated by arrows. Each signal line originates at a transmitting circuit 7 comprising, for example, a first-in-first-out shift register, and terminates at a receiving circuit 9 which may likewise comprise a first-in-first-out shift register. The purpose of the invention is to test the transmitting and receiving circuits 7 and 9 without halting communication between the printed circuit boards 5, or between the first data processing apparatus 1 and second data processing apparatus 3.

The printed circuit boards 5 contain components such as memory and processor devices for performing data processing functions. Although not explicitly shown in the drawing, these components may communicate with one another by means of additional transmitting and receiving circuits, which can also be tested using the present invention.

The first communication circuit fault detector to be described tests a un-directional communication circuit, which moves data in a single direction at a certain communication rate f, such as 9600 bits per second. The communication circuit may include a single transmitting circuit 7 or a single receiving circuit 9 in FIG. 1. Alternatively, the communication circuit may comprise a transmitting circuit, a receiving circuit, and their interconnecting signal line, particularly when the transmitting and receiving circuits are located on the same printed circuit board.

Figure 2:
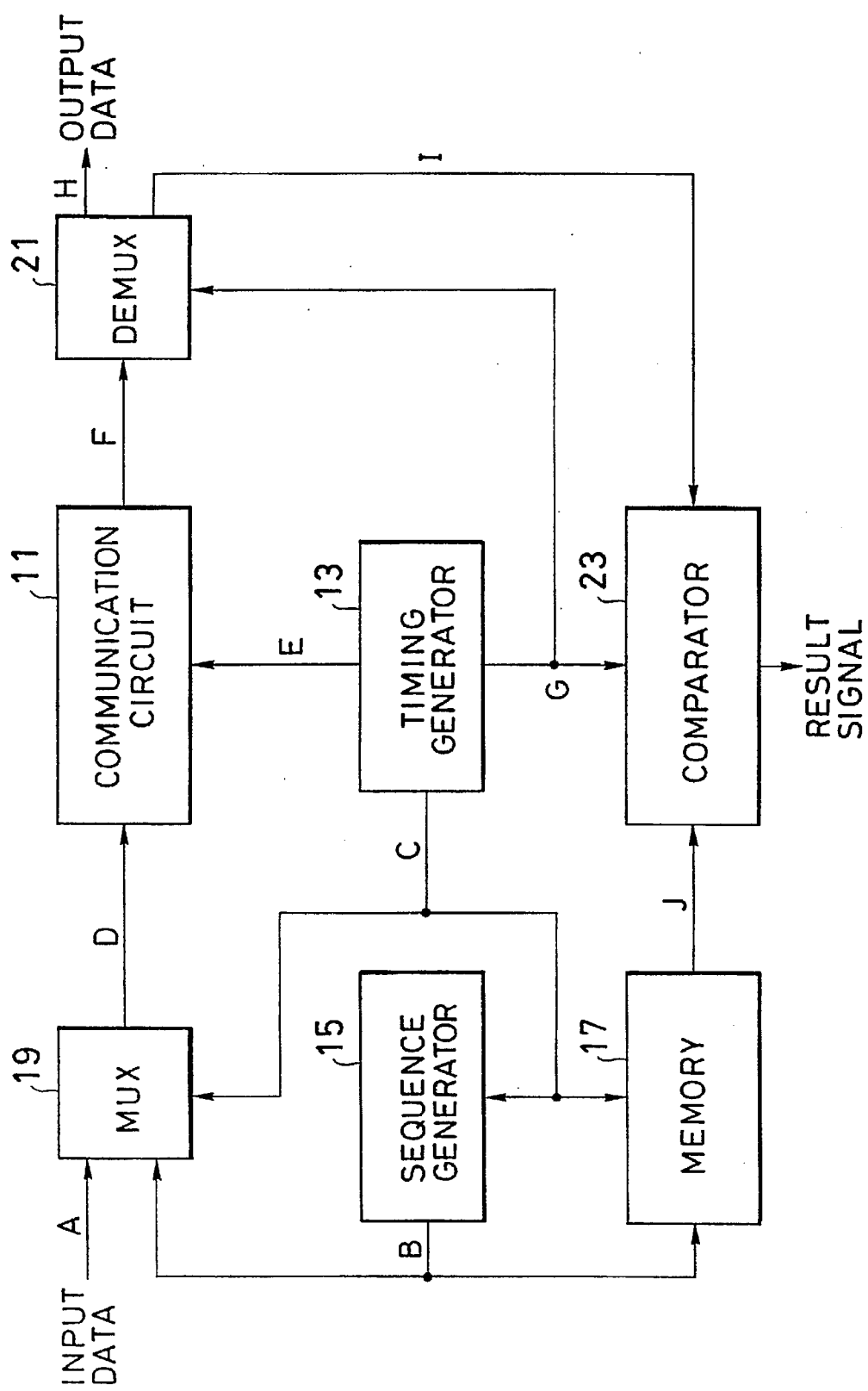
FIG. 2 is a block diagram of a communication circuit fault detector for testing a uni-directional communication circuit.

With reference to FIG. 2, the communication circuit 11 is coupled to a timing generator 13 which generates first, second, and third clock signals C, E, and G. The first clock signal C has a frequency f/n equal to the communication rate f divided by a positive integer n. The second clock signal E has a frequency of 2·f. The third clock signal G has the same frequency (f/n) as the first clock signal.

The first clock signal C is supplied to a sequence generator 15, which generates a test signal B comprising a certain bit sequence, bits being generated at the rate f/n. The first clock signal C is also supplied to a memory circuit 17 which is coupled to the sequence generator and temporarily stores the test signal. If it is only necessary to store one test bit at a time, the memory circuit 17 may comprise a simple latch. If it is necessary to store more than one bit at a time, the memory circuit 17 may comprise a first-in-first-out shift register.

The first clock signal C is furthermore supplied to a multiplexer 19, which is coupled to the sequence generator 15 and the communication circuit 11, and also receives the input data signal A to be passed through the communication circuit 11. The multiplexer 19 is a standard two-to-one multiplexer that multiplexes the input data signal A and the test signal B into the communication circuit 11. The multiplexer 19 selects the input data signal A when the first clock signal C is in, for example, the low state, selects the test signal B when the first clock signal C is in the high state, and passes the selected signal to the communication circuit 11 as a multiplexed signal D.

The second clock signal E is supplied to the communication circuit 11 and drives the communication circuit 11 at twice the communication rate f. Thus the communication circuit 11 samples the multiplexed signal D at intervals of 0.5/f, and produces an output signal F having a bit rate of 2·f.

The third clock signal G is supplied to a demultiplexer 21, which is coupled to the communication circuit 11 and demultiplexes the output signal F from the communication circuit 11, producing an output data signal 11 and a returned test signal 1. When the third clock signal is in, for example, the low state, the demultiplexer 21 connects the output signal F to the output data signal line I, while the returned test signal I retains its previous value. When the third clock signal is in the high state, the demultiplexer 21 connects the output signal F to the returned test signal line I, while the output data signal H retains its previous value.

The third clock signal G is also supplied to a comparator 23, which is coupled to the memory circuit 17 and the demultiplexer 21. At each cycle of the third clock signal G the comparator 23 compares the returned test signal I with the test signal stored in the memory circuit 17 and generates a result signal indicating whether the returned test signal matches the stored test signal.

The operation of this communication circuit fault detector will next be described for the case in which n=2. If the communication rate is 9600 bits per second, for example, then the first and third clock signals have frequencies of 4800 Hz and the second clock signal has a frequency of 19,200 Hz. The sequence generator 15 produces test signals at the rate 4800 bits per second. The communication circuit 11 will be shown as having a delay of one cycle of the second clock signal E. The memory circuit 17 will be a latch that stores one test bit.

Figure 3:
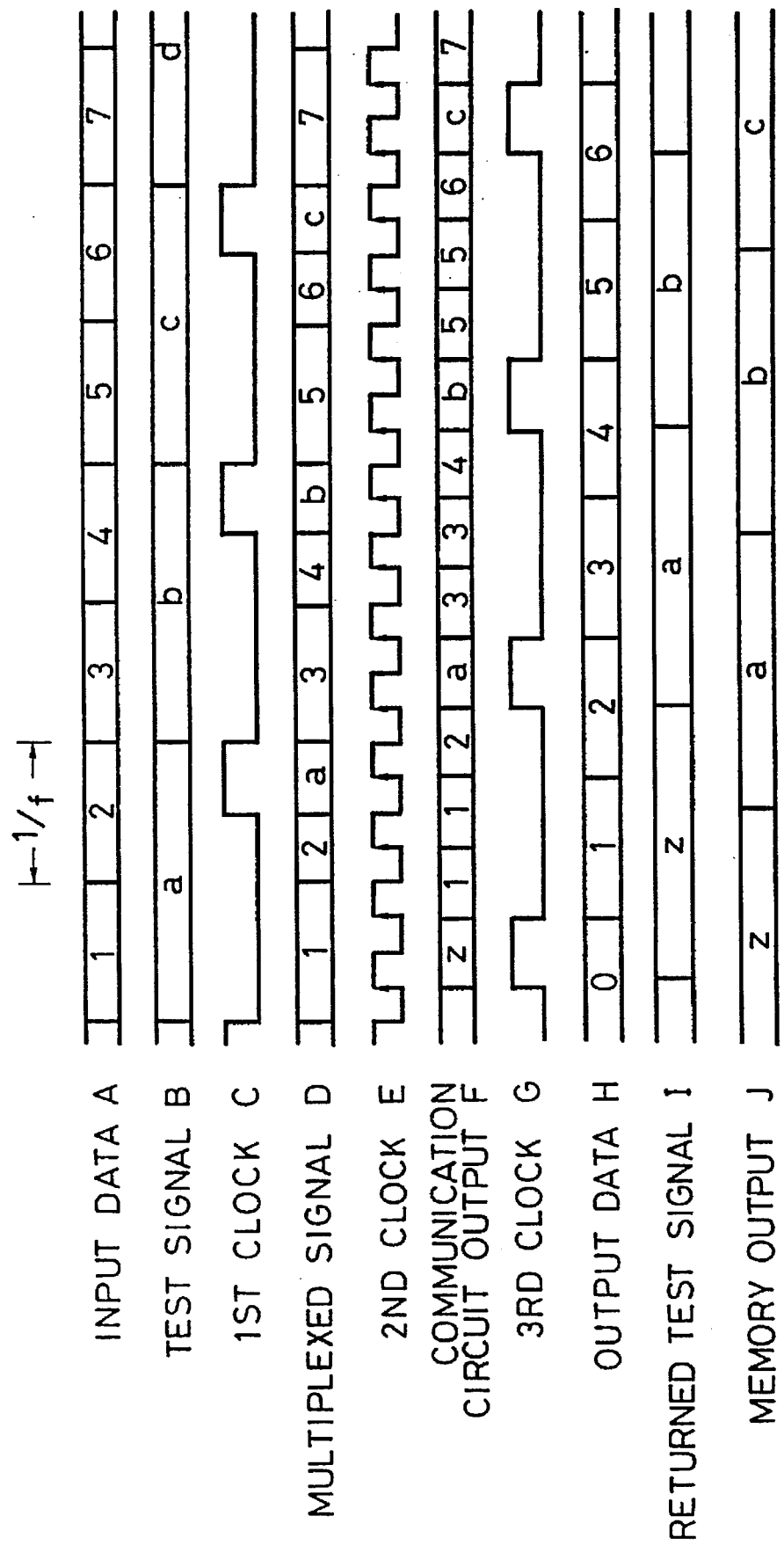
FIG. 3 is a timing diagram illustrating the operation of the communication circuit fault detector in FIG. 2 for the case n=2.

With reference to FIG. 3, the input data signal A comprises a series of bits (1, 2, 3, . . . ) and the test signal B comprises a series of bits (a, b, c, . . . ). The first clock signal C is a pulse signal comprising high pulses with a width of 0.5/f. The sequence generator is generates a new test bit at the falling edge of each pulse of the first clock signal C. The memory circuit 17 latches each test bit on the rising edge of the first clock signal C, producing as output the signal shown at J.

The multiplexer 19 selects the input data signal A when the first clock signal C is low and the test signal when the first clock signal C is high, thus producing the multiplexed signal shown at D in FIG. 3. The communication circuit 11 samples the multiplexed signal D on each rising edge of the second clock signal E and produces the sampled data, after an internal delay of one clock cycle, as the output signal F.

The third clock signal G is a pulse signal similar to the first clock signal C, comprising high pulses with a width of 0.5/f, but lagging the first clock signal C in phase. The phase lag in this case is 1.5 cycles of the second clock E, compensating for the sampling delay and internal delay of the communication circuit 11. The demultiplexer 21 demultiplexes the output signal F according to the third clock signal G, producing the output data signal H and returned test signal I.

The comparator 23 operates on the falling edge of the third clock signal G, sampling the returned test signal I and the memory output J at tills time, comparing them, and producing a result signal that indicates whether they match. The result signal can be furnished to a circuit, not shown in the drawings, that initiates an error-handling action when the returned test signal I and memory output J fail to match.

The testing operation described above in no way interferes with normal data communication. The output data signal H is the same as it would be if the multiplexer 19, the demultiplexer 21, and the other test circuits were removed and the communication circuit 11 were clocked at the normal rate f. The test can accordingly be performed constantly during normal communication, so that faults will be detected as soon as they occur, greatly enhancing the reliability of the communication circuit.

Next a communication circuit fault detector will be described for testing a bi-directional communication circuit comprising a transmitting circuit for transferring data in one direction and a receiving circuit for transferring data in the other direction. For example, the communication circuit may comprise the transmitting circuit 7 and the receiving circuit 9 in the second data processing apparatus 3 shown in FIG. 1.

Figure 4:
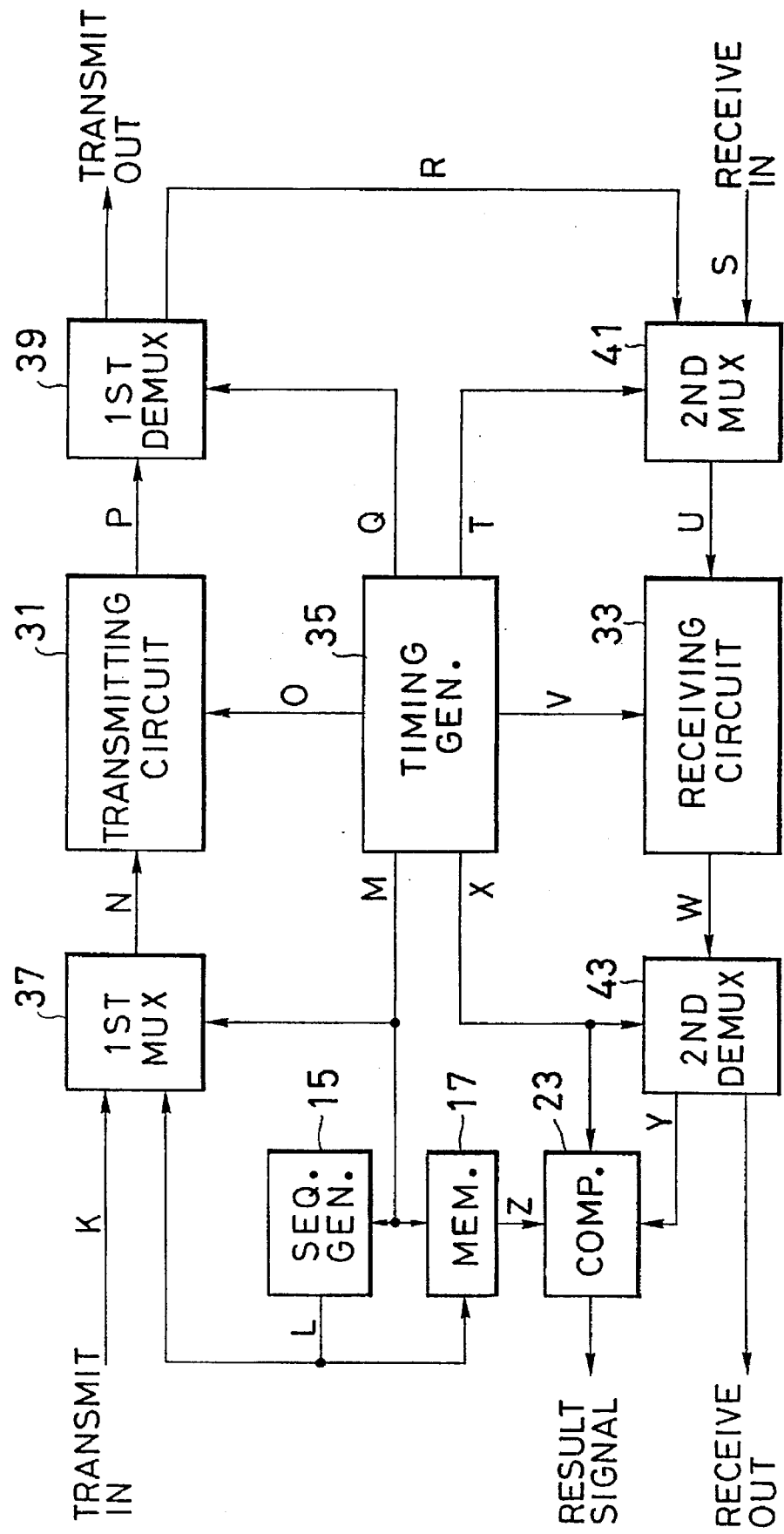
FIG. 4 is a block diagram of a communication circuit fault detector for testing a bi-directional communication circuit.

With reference to FIG. 4, the transmitting circuit 31 and receiving circuit 33 are connected to a timing generator 35 that generates first, second, third, fourth, fifth, and sixth clock signals M, O, Q, T, V, and X. The first and third clock signals M and Q are similar to the first and third clock signals in FIG. 2, having frequencies of f/n, where f is the normal communication rate and n is a positive integer. The fourth and sixth clock signals T and X also have frequencies of f/n. The first, third, fourth, and sixth clock signals are all pulse signals comprising high pulses with a width of 0.5/f. The second and fifth clock signals O and V have frequencies of 2·f.

The first clock signal C is supplied to a sequence generator 15, a memory circuit 17, and a first multiplexer 37 similar to the sequence generator 15, memory circuit 17, and multiplexer 19 in FIG. 2. The first multiplexer 37 receives an input transmit signal K and a test signal L from the sequence generator 15 and multiplexes them into the transmitting circuit 31 by selecting the input transmit signal K when the first clock signal M is low and the test signal L when the first clock signal M is high, thus producing a first multiplexed signal N.

The second clock signal O is supplied to the transmitting circuit 31, driving the transmitting circuit 31 at twice the communication rate f. From the first multiplexed signal N the transmitting circuit 31 thus produces an output signal P with a bit rate of 2·f.

The third clock signal Q is supplied to a first demultiplexer 39 which demultiplexes the output signal P from the transmitting circuit 31, producing an output transmit signal and a loop-back signal R.

The fourth clock signal T is supplied to a second multiplexer 41. The second multiplexer 41 receives an input receive signal S and the loop-back signal R from the first demultiplexer 39 and multiplexes them into the receiving circuit 33 by selecting the input receive signal S when the fourth clock signal T is low and the loop-back signal R when the fourth clock signal T is high, thus producing a second multiplexed signal U.

The fifth clock signal V is supplied to the receiving circuit 33, driving the receiving circuit 33 at twice the communication rate f. From the second multiplexed signal U, the receiving circuit 33 produces an output signal W with a bit rate of 2·f.

The sixth clock signal X is supplied to a second demultiplexer 43 which demultiplexes the output W from the receiving circuit 33 to produce an output receive signal and a returned test signal Y. The sixth clock signal X is also supplied to a comparator 23 similar to the comparator 23 in FIG. 2, which compares the returned test signal Y with the output Z from the memory circuit 17 and generates a result signal indicating whether the two signals match.

The operation of this communication circuit fault detector will be illustrated for two cases: one in which n=1, and another in which n=3.

Figure 5:
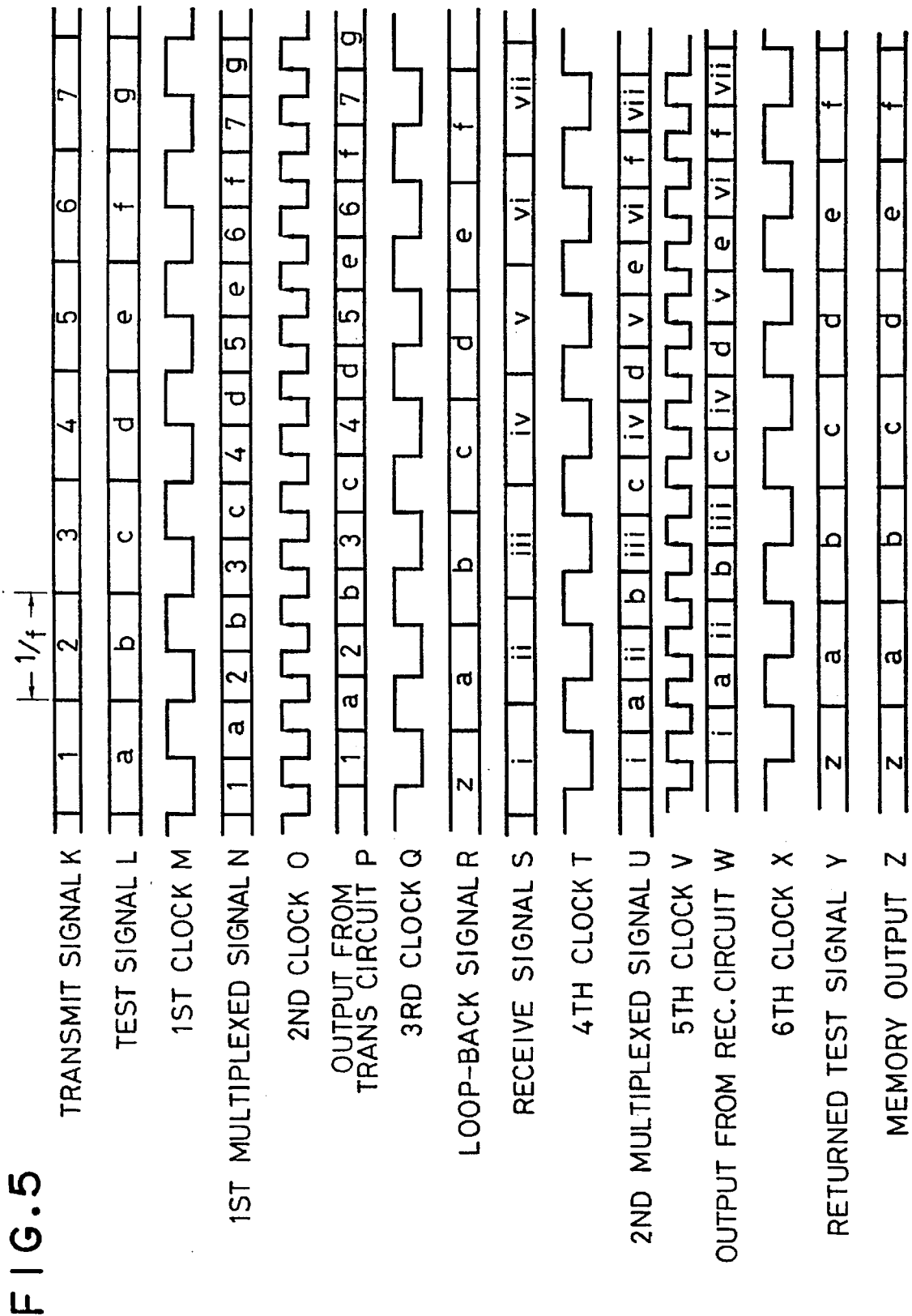
FIG. 5 is a timing diagram illustrating the operation of the communication circuit fault detector in FIG. 4 for the case n=1.

The n=1 case is shown in FIG. 5. If the communication rate is 9600 bits per second, then the first, third, fourth, and sixth clock signals have frequencies of 9600 Hz while the second and fifth clock signals have frequencies of 19,200 Hz. Here the memory circuit 17 is a two-stage shift register comprising, for example, an input latch and an output latch connected in series. The transmitting circuit 31 and receiving circuit 33 are simple latch circuits with no appreciable internal delay.

The input transmit signal K and test signal L are multiplexed as shown in FIG. 5, producing the first multiplexed signal N. The memory circuit 17 latches the test signal L in its input latch on the rising edge of the first clock signal M and transfers the test signal L to its output latch on the falling edge of the first clock signal M. The output of the memory circuit 17 is thus as shown at Z in FIG. 5.

The transmitting circuit 31 samples the first multiplexed signal N on the rising edge of the second clock signal O, the sampled value immediately becoming the output P of the transmitting circuit 31. Using the third clock signal Q, the first demultiplexer 39 demultiplexes the output signal P to an output transmit signal (not shown in FIG. 5) and a loop-back signal R. The second multiplexer 41 multiplexes the loop-back signal R and the input receive signal S according to the fourth clock signal T, producing a second multiplexed signal U.

The receiving circuit 33 samples the second multiplexed signal U on the rising edge of the fifth clock signal V, the sampled value immediately becoming the output W of the receiving circuit 33. Using the sixth clock signal X, the second demultiplexer 43 demultiplexes the output signal W to an output receive signal (not shown in FIG. 5) and a returned test signal Y.

The comparator 23 compares the returned test signal Y with the output Z from the memory circuit 17, the comparison being made on the failing edge of the sixth clock signal X. Failure of the returned test signal Y and memory output Z to match indicates a fault in either the transmitting circuit 31 or the receiving circuit 33.

This testing operation does not interfere with data communication in either direction. Both the transmit signal and the receive signal pass through as they would in the absence of the fault detector circuitry.

The n=3 case is illustrated in FIG. 6. If the communication rate is 9600 bits per second, then the first, third, fourth, and sixth clock signals have frequencies of 3200 Hz while the second and fifth clock signals have frequencies of 19,200 Hz. The memory circuit 17 is again a two-stage shift register, and the transmitting circuit 31 and receiving circuit 33 are simple latch circuits with no appreciable internal delay.

There are two differences between the n=1 case shown in FIG. 5 and the n=3 case shown in FIG. 6. One difference is that in FIG. 6, the third and fourth clock signals Q and T are offset in phase to compensate for sampling delays and for the phase non-alignment of the loop-back signal R and the input receive signal S. The other difference is that in FIG. 6 both the input and output arches of the memory circuit 17 are triggered by the rising edge of of the first clock signal M, so that each test signal bit spends one full first clock cycle in the input latch of the memory circuit 17, then one full cycle in the output latch. The output of the memory circuit 17 therefore appears as shown at Z in FIG. 6.

Aside from these differences, the n=3 case operates in the same way as the n=3 case, the comparator 23 detecting faults by comparing the returned test signal Y with the memory output Z on the failing edge of the sixth clock signal X in FIG. 6. Further description will be omitted. As in the n=1 case, there is no interference with normal data communication.

The transmitting circuit 31 and receiving circuit 33 in FIG. 4 have been described as simple latch circuits with no internal delay, but they may also comprise first-in-first-out shift registers of arbitrary length, the memory circuit 17 and the phase relationships of the clock signals being modified accordingly.

The clock signals furnished to the multiplexers and demultiplexers have been described as having steady, equal frequencies, but with long first-in-first-out shift registers, burst clocking can be employed by supplying different clock frequencies at different times. The multiplexer and demultiplexer burst rates may differ, although the long-term average rates must still be equal.

FIGS. 3, 5, and 6 have illustrated cases of n=1, 2, and 3, but it will be apparent that with a suitable memory circuit 17 and suitable phase relationships among the clock signals, n can be any positive integer. In particular, an inexpensive, low-speed sequence generator 15 can be used to test communication circuits operating at a variety of higher communication rates.

Although the memory circuit 17 is shown in FIGS. 2 and 4 as a separate component, it can be integrated with either the sequence generator 15 or the comparator 23. A one-bit memory can be realized as an input latch, triggered by the first clock signal, in the comparator 23. Alternatively, if the sequence generator 15 uses a shift register as its output circuit, then a multiple-bit memory circuit 17 can be realized by using the final bit position in the shift register as the memory output, and the output from a preceding bit position as the test signal.

Other modifications of an obvious nature can also be made to the detectors described above without departing from the spirit and scope of the invention, which should be determined solely according to the appended claims.

What is claimed is:

1. A communication circuit fault detector for testing a data communication circuit during communication of a data signal at a certain communication rate during normal operation of the data communication circuit, comprising:

sequence generating means for generating an original test signal, specifically prepared for a digital communication test, said original test signal including a bit sequence which is separate from said data signal;

a multiplexer, coupled to said sequence generating means and said data communication circuit, for multiplexing said original test signal and said data signal to produce a multiplexed signal and inputting the multiplexed signal into said data communication circuit during normal operation of said data communication circuit;

a timing generator, coupled to said data communication circuit for driving said communication circuit at a rate faster than said certain communication rate;

a demultiplexer, coupled to said data communication circuit, for demultiplexing the multiplexed signal into an output signal and a return digital test signal during normal operation of said data communication circuit; and a comparator, coupled to said demultiplexer and said sequence generating means, for comparing said return digital test signal with a duplicate of said original test signal which did not pass through the communication circuit and generating a result signal, during normal operations of the data communication circuit, indicating whether said return digital test signal matches the duplicate of said original test signal.

2. The detector of claim 1, wherein said timing generator supplies a first clock signal with a frequency equal to said communication rate divided by a positive integer to said sequence generating means and said multiplexer.

3. The detector of claim 2, wherein said first clock signal includes pulses of a width equal to 0.5 divided by said communication rate.

4. The detector of claim 3, wherein said multiplexer selects, for multiplexing into said communication circuit, said original digital test signal during said pulses of said first clock signal and said data signal at other times.

5. The detector of claim 2, wherein said timing generator supplies a second clock signal with a frequency equal to twice said communication rate to said communication circuit, thus driving said data communication circuit at twice said communication rate.

6. The detector of claim 2, wherein said timing generator supplies a third clock signal to said demultiplexer and said comparator, the frequency of said third clock signal being equal to the frequency of said first clock signal.

7. The detector of claim 6, wherein said third clock signal is a pulse signal comprising pulses of a width equal to 0.5 divided by said communication rate.

8. The detector of claim 7, wherein said demultiplexer demultiplexes said output signal from said data communication circuit to said return digital test signal during said pulses of said third clock signal, and to an output data signal at other times.

9. The detector of claim 1, further comprising:

a memory circuit, coupled to said sequence generating means, for storing said original test signal;

wherein said comparator is also coupled to said memory circuit and compares said return digital test signal with said original test signal stored in said memory circuit.

* * * * *

UNITED STATES PATENT AND TRADEMARK OFFICE
CERTIFICATE OF CORRECTION

PATENT NO : 5,640,401
DATED : June 17, 1997
INVENTOR(S): Yoshiko YAMADA

It is certified that error appears in the above-identified patent and that said Letters Patent is hereby corrected as shown below:

Column 2, line 42, change "un-directional" to --uni-directional--.

Signed and Sealed this

Twenty-sixth Day of January, 1999

Attest:

Attesting Officer

*Acting Commissioner of Patents and Trademarks*